United States Patent
Jiang et al.

(10) Patent No.: US 11,882,609 B2
(45) Date of Patent: Jan. 23, 2024

(54) MULTILINK OPERATIONS IN WIRELESS LOCAL AREA NETWORK

(71) Applicant: Apple Inc., Cupertino, CA (US)

(72) Inventors: Jinjing Jiang, San Jose, CA (US); Jarkko L. Kneckt, Los Gatos, CA (US); Lochan Verma, Danville, CA (US); Qi Wang, Sunnyvale, CA (US); Su Khiong Yong, Palo Alto, CA (US); Tianyu Wu, Fremont, CA (US); Yong Liu, Campbell, CA (US)

(73) Assignee: Apple Inc., Cupertino, CA (US)

(*) Notice: Subject to any disclaimer, the term of this patent is extended or adjusted under 35 U.S.C. 154(b) by 164 days.

(21) Appl. No.: 17/249,623

(22) Filed: Mar. 8, 2021

(65) Prior Publication Data
US 2021/0282209 A1    Sep. 9, 2021

Related U.S. Application Data

(60) Provisional application No. 62/986,211, filed on Mar. 6, 2020.

(51) Int. Cl.
| | |
|---|---|
| *H04W 76/15* | (2018.01) |
| *H04W 48/12* | (2009.01) |
| *H04W 74/08* | (2009.01) |

(52) U.S. Cl.
CPC ........... *H04W 76/15* (2018.02); *H04W 48/12* (2013.01); *H04W 74/0816* (2013.01)

(58) Field of Classification Search
CPC . H04W 76/15; H04W 48/12; H04W 74/0816; H04W 48/16; H04W 76/18; H04W 84/12; H04W 74/006
See application file for complete search history.

(56) References Cited

U.S. PATENT DOCUMENTS

| | | | |
|---|---|---|---|
| 2020/0288523 A1* | 9/2020 | Patil | H04L 1/1621 |
| 2021/0076412 A1* | 3/2021 | Naribole | H04W 76/38 |
| 2022/0132572 A1* | 4/2022 | Fang | H04W 74/0808 |

\* cited by examiner

*Primary Examiner* — Eric Myers
(74) *Attorney, Agent, or Firm* — Fay Kaplun & Marcin, LLP

(57) ABSTRACT

A multilink access point may communicate with a legacy device. The multilink access point identifies an attempt, by at least one legacy station, to connect to the access point, determines that the at least one legacy station does not support multilink communications, broadcasts a beacon identifying information for a basic communication link that can be used by the at least one legacy station and associates with the at least one legacy station based at least on information included in the beacon, wherein the at least one legacy station communicates exclusively on the basic communication link with the access point.

14 Claims, 7 Drawing Sheets

MULTILINK OPERATIONS IN WIRELESS LOCAL AREA NETWORK

PRIORITY CLAIM/INCORPORATION BY REFERENCE

The present disclosure claims priority to U.S. Prov. Appln. Ser. No. 62/986,211 filed Mar. 6, 2020 and entitled "MULTILINK OPERATIONS IN A WIRELESS LOCAL AREA NETWORK," the disclosure of which is incorporated herewith by reference.

BACKGROUND

Multilink stations (STA) may connect to with a wireless local area network (WLAN) via a multilink access point (AP) using, for example, links operating in the 2.4 gigahertz (GHz), 5 GHz and 6 GHz frequency bands. Current WLAN communication protocols only enable an AP/STA pair to communicate on a single channel, e.g., one link. If there is a problem with that single channel (e.g., a long network allocation vector (NAV), an overlapping basic service set (OBSS) channel access or any other type of interference on the channel), the AP/STA pair is forced to wait until the channel clears to exchange communications. These long and unpredictable channel access problems do not allow a single channel AP/STA pair to support extremely low latency (ELL) communications.

Multiple operating links may be used to support ELL communications such that when a problem is encountered on one channel, the AP/STA pair may switch to another channel to continue communicating.

SUMMARY

Some exemplary embodiments are related to a processor of a multilink access point configured to perform operations. The operations include identifying an attempt, by at least one legacy station, to connect to the access point, determining that the at least one legacy station does not support multilink communications, broadcasting a beacon identifying information for a basic communication link that can be used by the at least one legacy station and associating with the at least one legacy station based at least on information included in the beacon, wherein the at least one legacy station communicates exclusively on the basic communication link with the access point.

Other exemplary embodiments are related to a processor of a multilink access point configured to perform operations. The operations include broadcasting a configuration that identifies a link of a plurality of links as a control link, wherein the control link is used by the access point to transmit at least one of control frames, polling frames, data frames, or management frames, polling associated stations via the control link using one or more polling frames and receiving at least one response to the polling, the at least one response indicating that at least one of the associated stations is attempting to establish a low latency session with the access point.

Still further exemplary embodiments are related to a processor of a multilink station configured to perform operations. The operations include accessing a first communication link to send a first transmission to a multilink access point, requesting, from the multilink access point, approval to transmit a second transmission on a second communication link, from the station to the multilink access point, contemporaneously with the first transmission on the first communication link and transmitting, responsive to approval from the multilink access point, the second transmission on the second link such that it at least partially overlaps in time with the first transmission on the first communication link.

DETAILED DESCRIPTION

Figure 1:
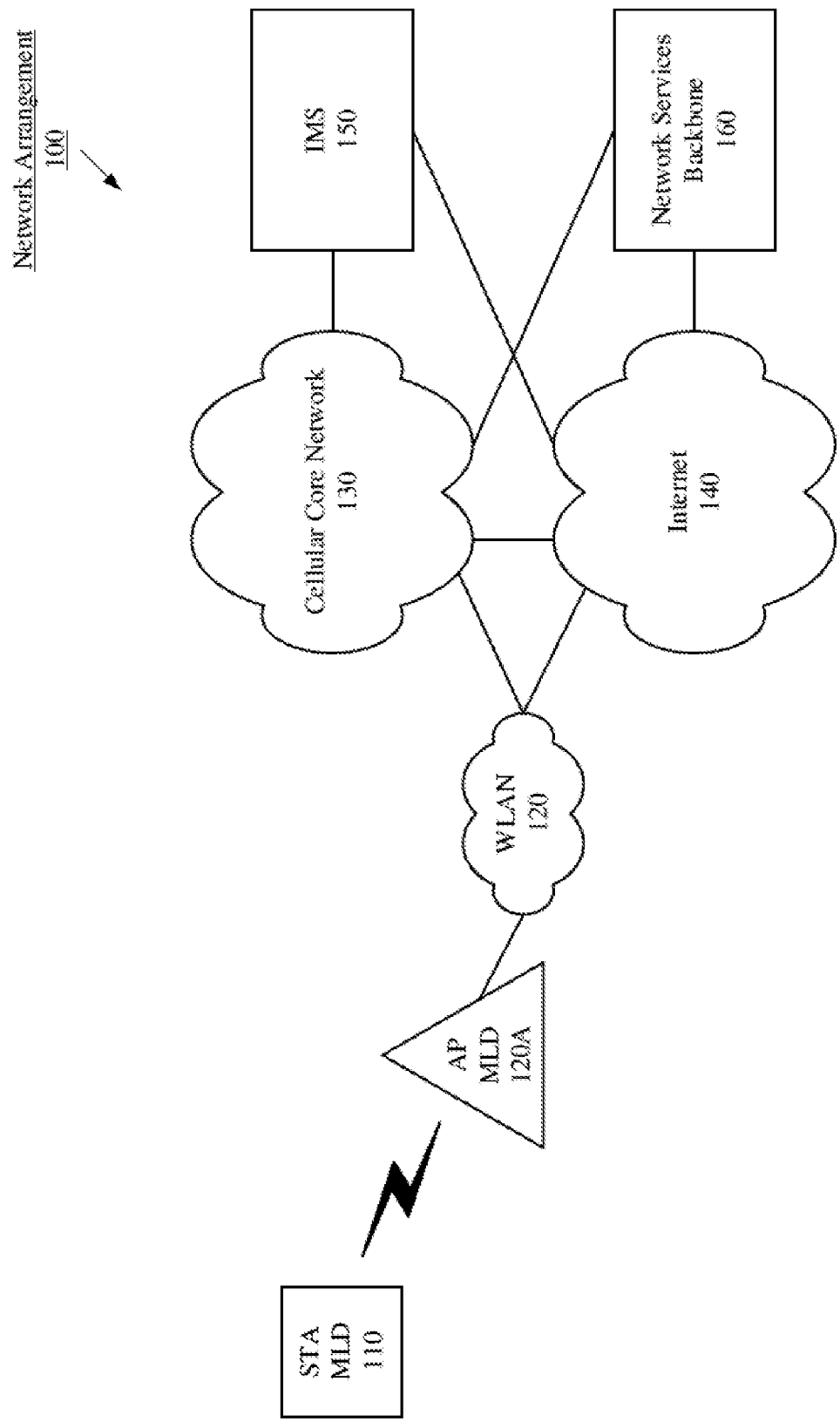
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe devices, systems and methods to operate a wireless local area network (WLAN) basic service set (BSS) with devices capable of multi-link transmission.

The exemplary embodiments are described with regard to a WLAN. A person of ordinary skill in the art would understand that WLAN may refer to a network that operates in accordance with any of a plurality of different types of Institute of Electrical and Electronics Engineers (IEEE) 802.11 wireless communication protocols. The exemplary embodiments are described with reference to the developing 802.11be standard. However, the exemplary embodiments may also be applied as an upgrade to other 802.11 communication protocols such as, 802.11a, 802.11b, 802.11g, 802.11n, 802.11ac, 802.11ax, etc. The WLAN may operate in several different frequency bands of the radio frequency (RF) spectrum. For example, the operating frequencies may include but are not limited to, the 900 megahertz (MHz), 2.4 gigahertz (GHz), 3.6 GHz, 4.9 GHz, 5 GHz, 5.9 GHz, 6 GHz, 60 GHz bands, etc. Each band may include a plurality of channels. However, any reference to WLAN, a particular communication protocol or a particular frequency band is for illustrative purposes. The exemplary embodiments apply to any type of network that supports packet-based communication over multiple links between devices.

The exemplary embodiments are described with regard to a multilink station (STA) communicating with a multilink access point (AP). However, it should be understood that the exemplary embodiments may apply to wireless communications between any two multilink devices.

In multilink operations, there are RF constraints that may prevent two adjacent links from performing simultaneous transmission and reception operations. For example, if a first link is operating on the 5 GHz channel and a second adjacent link is operating on the 6 GHz channel, the interlink interference between these two links may prevent simultaneous transmission and reception on the different links.

However, an AP may still serve legacy STAs (e.g., non-multilink STAs) without any limitations on the available medium access control (MAC) layer and/or physical (PHY) layer interfaces. This could lead to the problem that the dynamic behavior of legacy STAs (e.g., frequency hopping) on different links could render the multilink operation useless because of the interference.

According to some exemplary embodiments, a multilink AP may determine that at least one legacy station that does not support multilink communications is attempting to connect to the AP. The AP then broadcasts a beacon identifying information for a basic communication link for the at least one legacy station, and associates with the at least one legacy station based at least on information included in the beacon. The at least one legacy station may communicate exclusively on the basic communication link with the AP.

In addition, many current devices have multiple radio chains that makes concurrent operation possible. Moreover, a separated control plane may be used if the proper link is selected for the control link. However, there should be a method to select this control link and operate the control link to fulfill the BSS needs in an efficient manner.

According to further exemplary embodiments, a multilink AP may broadcast a configuration that includes identifying one link of a plurality of links as a control link. The control link is used by the AP to transmit one of, for example, control frames, polling frames, data frames and management frames. The control link may be used to poll associated stations using polling frames, and receive at least one response to the polling indicating one of the stations is attempting to set up a low latency session with the AP.

Another issue that may arise in multilink communications is that an STA cannot simultaneously receive and transmit on two adjacent links. However, the STA may run independent enhanced distributed channel access (EDCA) on both links. Thus, the STA may be able to simultaneously transmit on both links. However, when performing this simultaneous transmission, the STA should have both transmissions end at approximately the same time to avoid interlink interference. The issue that arises is how such synchronous transmissions may be enabled on both links in a fair manner.

According to additional exemplary embodiments, a multilink STA may access a first communication link for transmission of an uplink transmission to a multilink AP, request, from the AP, that a further uplink transmission be transmitted on a second communication link from the STA to the AP synchronously with the transmission on the first communication link, receive an indication from the AP allowing the synchronous transmissions, and synchronously transmit the transmission on the first communication link and the further transmission on the second communication link.

Another issue may arise when a multilink STA cannot support simultaneous TX and RX and is operating on both a basic link and a non-basic link from a constrained multilink AP and the AP has STAs operating on adjacent links. The issue that arises is an extremely high throughput (EHT) STA on the non-basic link may interfere with the other STAs operation on the basic link.

According to still further exemplary embodiments an EHT STA uses a request to send (RTS)/clear to send (CTS) (or a synchronous RTS (sRTS)/synchronous (sCTS)). Otherwise, only trigger-based access is allowed on the non-basic links.

FIG. 1 shows an exemplary network arrangement 100 according to various exemplary embodiments. The exemplary network arrangement 100 includes a multilink STA 110. Those skilled in the art will understand that the STA 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of STAs being used by any number of users. Thus, the example of a single STA 110 is merely provided for illustrative purposes.

Further, the exemplary network arrangement 100 includes a wireless local access network (WLAN) 120. However, the STA 110 may also communicate with other types of networks and the STA 110 may also communicate with networks over a wired connection. Therefore, the STA 110 may include a WLAN chipset to communicate with the WLAN 120 and any of a plurality of further chipsets to communicate with other types of networks (e.g., 5G new radio (NR) radio access network (RAN), Long-Term Evolution (LTE) RAN, Legacy RAN, etc.).

The WLAN 120 may include any type of wireless local area network (WiFi, Hot Spot, soft AP, IEEE 802.11 networks, etc.). As described above, the exemplary embodiments are described with reference to the developing IEEE 802.11be communication protocol. WLANs may manage access to the network via any of a plurality of different hardware devices that are configured to send and/or receive traffic from STAs that are equipped with the appropriate WLAN chipset. In the exemplary network arrangement 100, the STA 110 may connect to the WLAN 120 via a multilink access point (AP) 120A. However, reference to an AP is merely provided for illustrative purposes. The exemplary embodiments may apply to any type of multilink device that manages access to a WLAN.

In addition to the WLAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of a cellular network. The cellular core network 130 also manages the traffic that flows between the cellular network and the Internet 140. The IMS 150 may be generally described as an architecture for delivering multimedia services to the STA 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
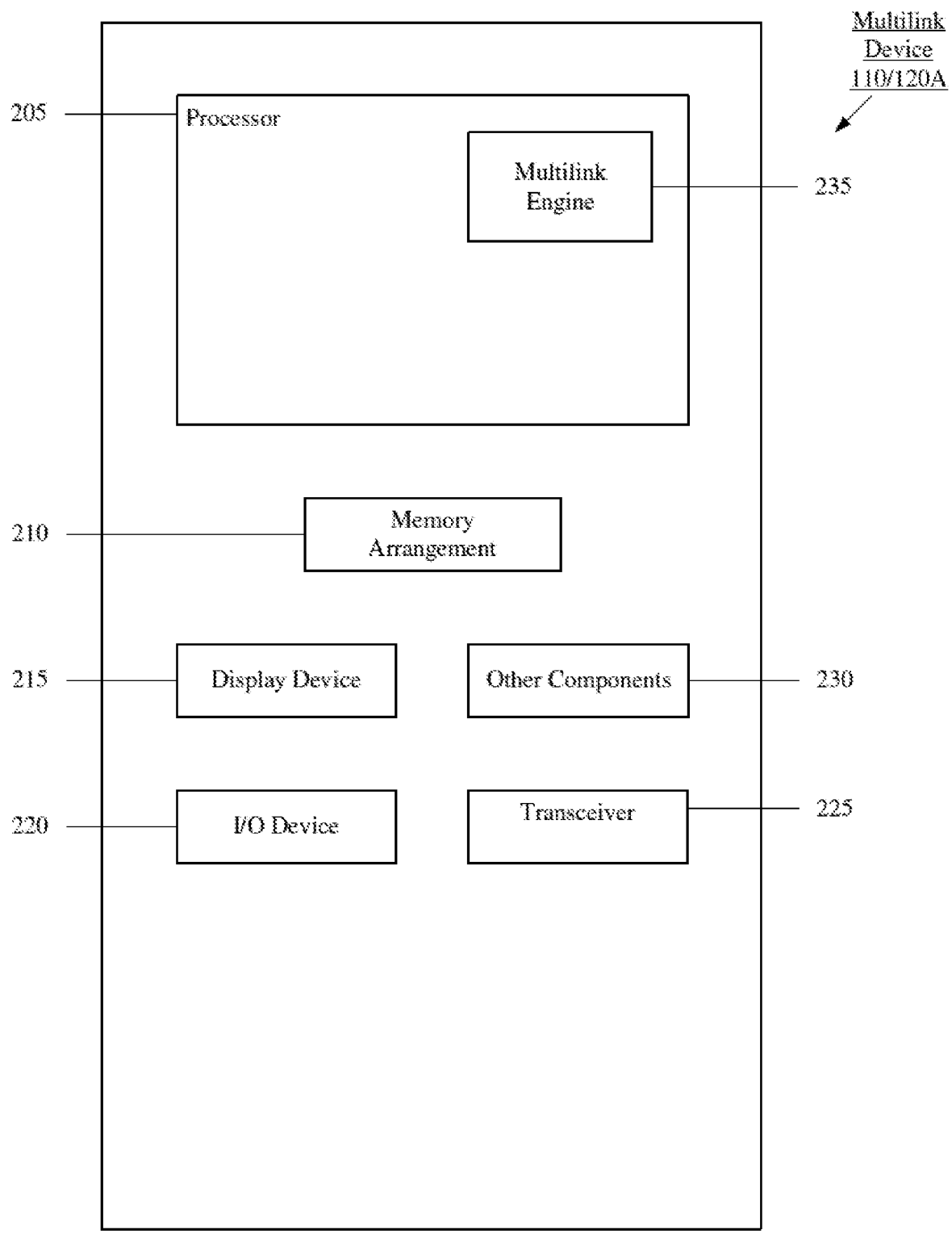
FIG. 2 shows an exemplary multilink device (MLD) according to various exemplary embodiments.

FIG. 2 shows an exemplary multilink device 110/120A according to various exemplary embodiments. That is, the multilink device described with respect to FIG. 2 may represent the STA 110 and/or the AP 120A. Those skilled in the art will understand that the STA 110 and the AP 120A may include the same components or may have some variance in the components between the devices. The multilink device 110/120A will be described with regard to the network arrangement 100 of FIG. 1. The multilink device 110/120A may represent any electronic device and may include a processor 205, a memory arrangement 210, a display device 215, an input/output (I/O) device 220, a transceiver 225, and other components 230. The other components 230 may include, for example, an audio input device, an audio output device, a battery, a constant power supply, a data acquisition device, ports to electrically connect the multilink device 110/120A to other electronic devices, sensors to detect conditions of the multilink device 110/120A, etc.

The processor 205 may be configured to execute a plurality of engines of the multilink device 110/120A. For example, the processor 205 may execute a multilink engine 235. The multilink engine 235 may perform various functionalities associated with the multilink communications for the multilink device 110/120A. The multilink engine 235 being an application (e.g., a program) executed by the processor 205 is only exemplary. The functionality associated with the fast link switch engine 235 may also be represented as a separate incorporated component of the multilink device 110/120A or may be a modular component coupled to the multilink device 110/120A, e.g., an integrated circuit with or without firmware. For example, the integrated circuit may include input circuitry to receive signals and processing circuitry to process the signals and other information. The engine may be embodied as one application or separate applications. In addition, in some multilink devices 110/120A, the functionality described for the processor 205 is split among two or more processors such as a baseband processor and an applications processor. The exemplary embodiments may be implemented in any of these or other configurations of a multilink device 110/120A.

The memory 210 may be a hardware component configured to store data related to operations performed by the multilink device 110/120A. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the WLAN 120. Accordingly, the transceiver 225 may operate on a variety of different frequencies or channels (e.g., set of consecutive frequencies) as described above. As will be described in greater detail below, the transceiver 225 may include multiple radios.

Figure 3:
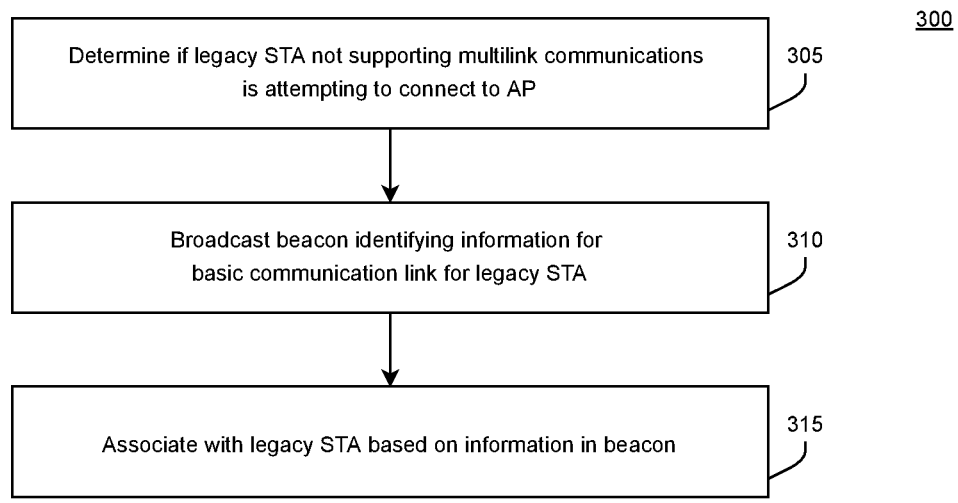
FIG. 3 shows a method of facilitating a separation between links for legacy stations (STAs) according to various exemplary embodiments.

FIG. 3 shows a method 300 of facilitating a separation between links for legacy stations (STAs) according to various exemplary embodiments. At 305, the AP (e.g., AP 120A) determines if at least one legacy STA that does not support multilink communications is attempting to connect to the AP. In some embodiments, the AP may provide that legacy STAs may associate and operate on independent links. For example, a first legacy STA may operate on a 2.4 GHz link while a second legacy STA may operate on a 5 GHz link. Because of the frequency separation between these links, simultaneous transmission and reception may be allowed because there should be no interlink interference and therefore the AP may use its multilink capabilities.

At 310, the AP may broadcast a beacon (or a series of beacons) that includes information about the links that may serve legacy STAs to accomplish this separation between links for legacy STAs. These beacons may define "basic" communication links for legacy STAs. The beaconing that may occur on other links (e.g., non-basic links) may not be understandable by the legacy STAs. In some embodiments, the beacon(s) may include data rate capability information such as high throughput (HT), very high throughput (VHT), high efficiency (HE) and extremely high throughput (EHT). This is in contrast to the non-basic link beacons that may only include EHT capabilities.

In current WLANs operating on 2.4 GHz and 5 GHz, the HE capability definition may depend on the HT and VHT capabilities. However, for 6 GHz channel, the HE capabilities may have new contents to remove the dependencies of the legacy capabilities. In some embodiments, there may be at least two manners of handling beacon design for basic links and non-basic links. In a first manner, the 802.11ax 6 GHz beacon design may be used for EHT capability for non-basic links, but the EHT capabilities in the beacon for basic links may still depend on legacy capabilities. In a second manner, both basic and non-basic links may use the same EHT capability information that does not rely on the legacy capabilities. It should be noted, however, that other manners of handling beacon design for basic and non-basic links may be used.

At 315, the AP associates with the at least one legacy STA based at least on information included in the beacon. The at least one legacy STA then communicates exclusively on the basic communication link with the AP.

Figure 4:
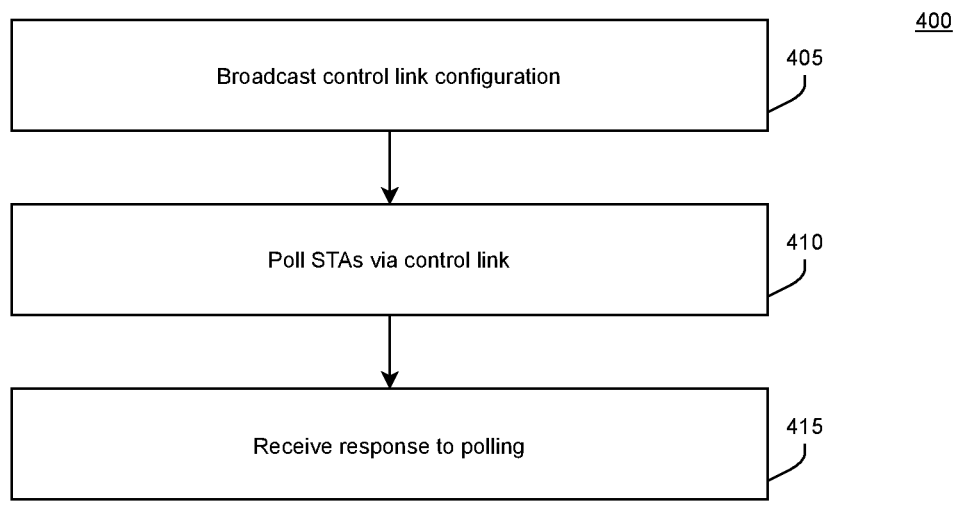
FIG. 4 shows a method of determining a control link according to various exemplary embodiments.

FIG. 4 shows a method 400 of determining a control link according to various exemplary embodiments. At 405, the AP (e.g., AP 120A) broadcasts the control link configuration in an operation element (OE). In some embodiments, the AP may also broadcast or update the AP's polling period for Quality of Service (QoS) purposes in addition to the control link configuration. However, the AP may dynamically change the control link based on, for example, a hopping pattern on a subset of links that are supported by both the AP and any attached STAs.

In some embodiments, the AP may continue to use the enhanced distributed channel access (EDCA) mechanism to access the channel. However, the contention windows from the EDCA parameters for the AP should be smaller than those advertised to the STAs. In this manner, the AP will have a channel access advantage over the STAs.

At 410, the AP may also poll the STAs on either a periodic basis or a scheduled basis over the control link. In some embodiments, a trigger frame may be defined to handle low latency sessions using additional signaling or an HE null data packet (NDP) Feedback Poll may be used in this case. The basic trigger frame may be transmitted on the control link but may also be transmitted on data links after the polling of the STAs is completed and the status of the STAs is determined.

In some embodiments, the AP may also transmit any types of frames to the STAs on the control link. That is, the control link may not be limited to control or polling frames. As such, data frames or management frames may also be transmitted on the control link. However, polling frames should be prioritized over other types of frames on the control link.

In some embodiments, the STAs initialize uplink frames to the AP only if the STAs are unassociated or the STAs only support a single link. At 415, the AP receives a response to the polling from at least one STA. The STA response to the AP polling may include data frames. Moreover, the STA may not use random access mechanisms to access the control link but instead may use the HE channel access mechanism.

Figure 5:
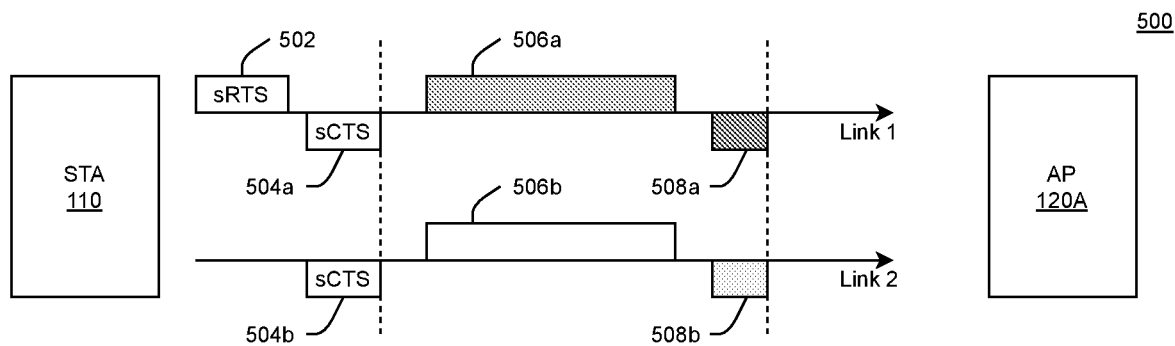
FIG. 5 shows a transmission diagram for synchronous transmissions on multiple links according to various exemplary embodiments.
Figure 6:
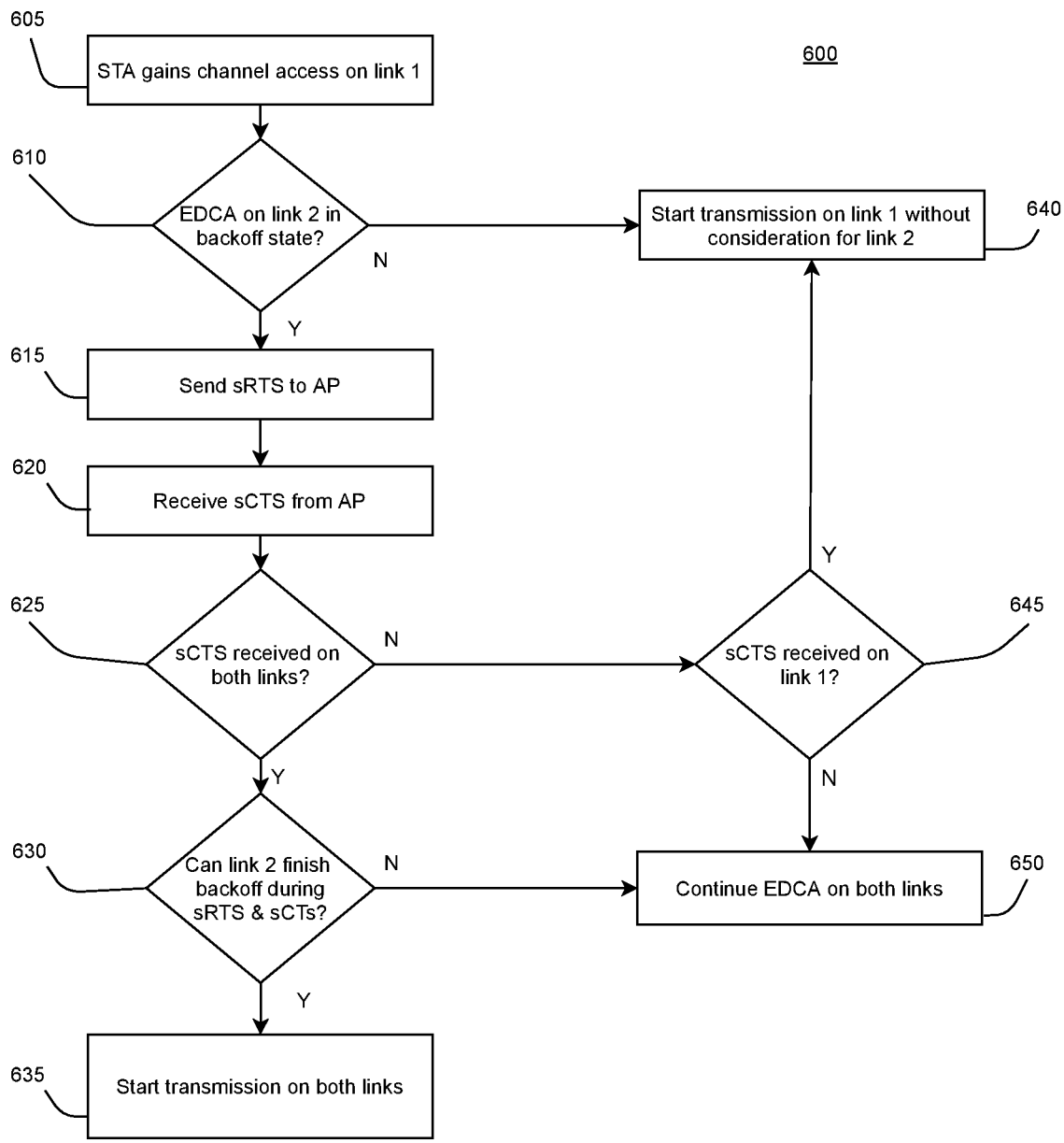
FIG. 6 shows a method for synchronous transmissions on multiple links according to various exemplary embodiments.

FIG. 5 shows a transmission diagram 500 for synchronous STA transmissions on multiple links according to various exemplary embodiments. The description of the transmission diagram 500 will also be made with reference to FIG. 6, which shows a method 600 for synchronous STA transmissions on multiple links according to various exemplary embodiments.

Although the method 600 is described with respect to two links, it should be noted that the method 600 may be extended to more than two links. At 605, the STA 110 gains channel access on the link 1. At 610, the STA 110 determines if the EDCA on link 2 is in a backoff state. As will be described in greater detail below, the synchronous transmission may be accomplished when the EDCA of link 2 is in the backoff state (assuming that link 2 is not the initial channel access link). If the EDCA on link 2 is not in the backoff state, then, at 640, the transmission 506a is started on link 1 without considering link 2 for a synchronous transmission. In some embodiments, the legacy RTS/CTS transmissions may be used when transmitting on a single link.

If, however, the EDCA on link 2 is in the backoff state, then, at 615, a synchronous RTS (sRTS) 502 is sent to the AP 120A to solicit a response from the AP 120 for both link 1 and link 2. The sRTS may include an indication to the AP 120A requesting an evaluation of the medium state during the transmission time. As stated above, the sRTS transmission is used when the STA is in the backoff state with respect to link 2 (e.g., the clear channel assessment (CCA) is idle and the NAV is 0).

At 620, the STA 110 receives a synchronous CTS (sCTS) (e.g., 504a and/or 504b) from the AP 120A in response to the sRTS 502. At 625, the STA 110 determines if the sCTS was received on both links 1 and 2. The sCTS may be based on the AP's CCA being idle and the NAV=0. In some embodiments, the AP CCA idle may be accessed in the PCF Interframe Space (PIFS) time before transmitting the sCTS on link 2. In some embodiments, the AP CCA idle may alternatively be accessed in the PIFS time before transmitting the sRTS on link 2. Also, by disregarding the APs backoff number an advantage is provided to the AP and STA.

In the example illustrated in FIG. 5, it is considered that the sCTS 504a, 504b was received on both links 1 and 2. However, it is possible that the sCTS is not received on both links 1 and 2. If the sCTS was not received on both links, then, at 645, the STA 110 determines if an SCTS was received on link 1. If an sCTS 504a was received on link 1, the transmission 506a is started on link 1 without there being any transmission on link 2. If an sCTS 504a was not received on link 1 (regardless of whether an sCTS was received on link 2), then, at 650, the STA 110 continues EDCA for both links.

However, if the sCTS 504a, 504b is received on both links 1 and 2 as shown in FIG. 5, then, at 630, the STA 110 determines whether the link 2 can finish the backoff during the sRTS and sCTS. If the link 2 cannot finish the backoff during the sRTS and sCTS, the method 600 proceeds to 650, where the EDCA is continued for both links. In some embodiments, the STA 110 may consider only the CCA and NAV in the determination at 630.

If, however, the link 2 can finish the backoff during the sRTS and sCTS, then, at 635, the STA 110 starts the synchronous transmissions 506a, 506b on links 1 and 2. As described above, the transmission should be configured such that the end of the transmissions are substantially aligned, as illustrated in FIG. 5. In some embodiments, this alignment may be achieved based on the inequality sRTS+sCTS+2SIFS>(CCA idle && NAV+Backoff) at sRTS transmission time. In some embodiments, the alignment may alternatively be achieved based on the CCA idle and NAV=0.

As also illustrated in FIG. 5, the STA 110 may receive an acknowledgement 508a, 508b from the AP 120A on both link 1 and link 2 to acknowledge receipt of the corresponding synchronous transmissions 506a, 506b.

Figure 7:
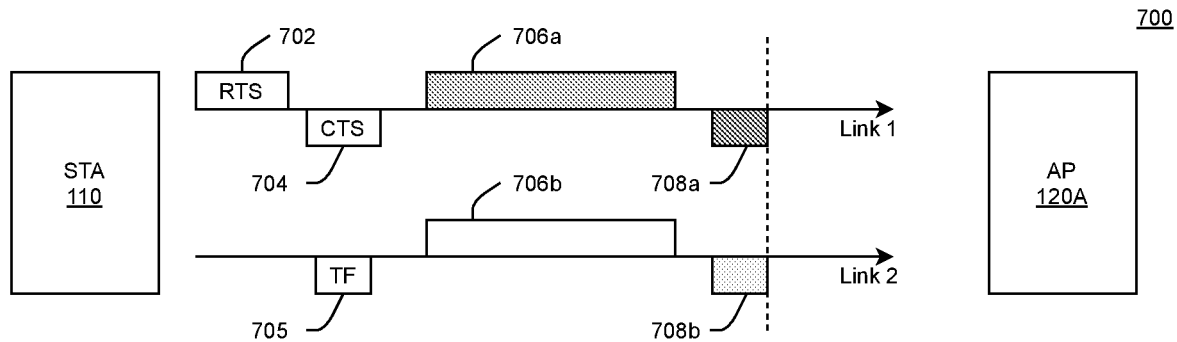
FIG. 7 shows a transmission diagram for synchronous transmissions on multiple links according to various exemplary embodiments.

FIG. 7 shows a transmission diagram 700 for synchronous STA transmissions on multiple links according to various exemplary embodiments. In some embodiments, the sRTS may be a new trigger frame type that is similar to the existing MU-RTS. In some embodiments, the sRTS frame may alternatively include the legacy RTS frame 702, as depicted in FIG. 7. For example, if the AP 120A receives an RTS frame 702 from a multilink capable STA (e.g., STA 110), the AP 120A may assume that that the STA desires to perform synchronous transmissions 706a, 706b. In some embodiments, a new type of control frame that includes the information as described above may alternatively be used.

In some embodiments, the sCTS may be the legacy CTS frame 704. In some embodiments, a trigger frame (TF) 705 from the AP 120A can trigger multiple STAs on link 2 including the STA 110 that transmits the sRTS (or RTS). In some embodiments, a new type of control frame that includes the information as described above may alternatively be used.

As also illustrated in FIG. 7, the STA 110 may receive an acknowledgement 708a, 708b from the AP 120A on both link 1 and link 2 to acknowledge receipt of the corresponding synchronous transmissions 706a, 706b.

Figure 8:
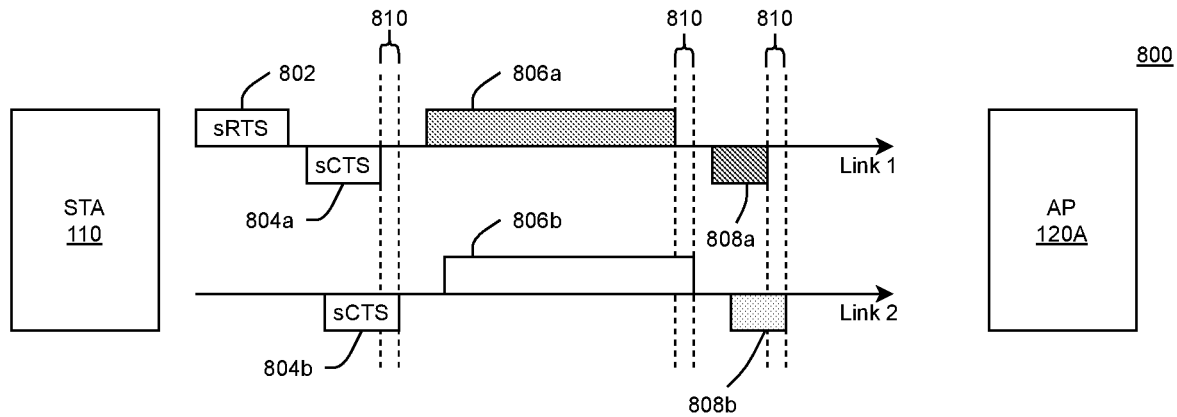
FIG. 8 shows a transmission diagram for synchronous TA transmissions on multiple links according to various exemplary embodiments.

FIG. 8 shows a transmission diagram 800 for synchronous STA transmissions on multiple links according to various exemplary embodiments. In some embodiments, the transmission alignment may be based on internal communications among links. For example, the MAC/PHY of link 1 may communicate the transmission time of the physical layer convergence protocol (PLCP) protocol data unit (PPDU) for link 1 to the link 2 such that the MAC/PHY of link 2 may align its PPDU. As described above, the end of the transmission times of the transmissions 806a, 806b should be substantially aligned. However, in some embodiments, it is not required that the times be exactly aligned. As illustrated in FIG. 8, if the maximum alignment offset 810 is within the short interframe space (SIFS) time, this will satisfy the "substantially aligned" criteria noted above. In addition, there is no requirement that the synchronous transmission be a single transmission on each link. Multiple transmissions may be sent in the transmission opportunity (TXOP) as long as each transmission after sRTS 802 in the TXOP substantially align. In some embodiments, the alignment offset 810 may also apply to the sCTs transmissions 804a, 804b as well as the acknowledgements 808a, 808b as shown in FIG. 8.

Figure 9:
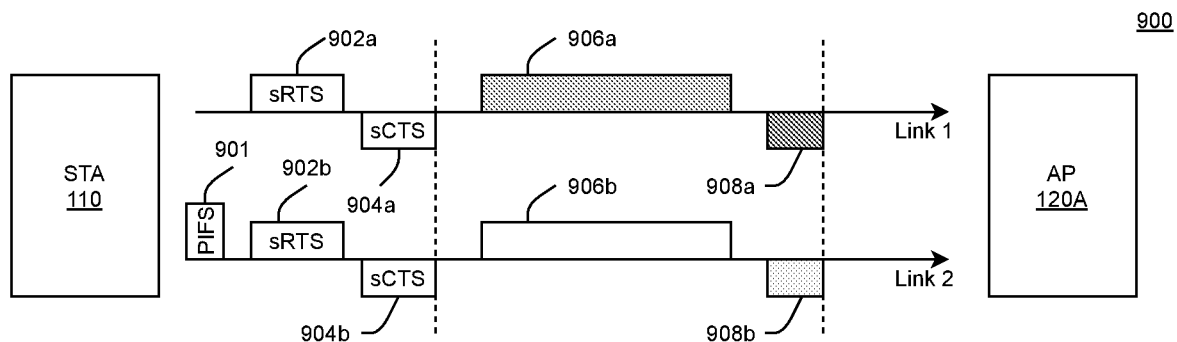
FIG. 9 shows a transmission diagram for synchronous transmissions on multiple links according to various exemplary embodiments.

FIG. 9 shows a transmission diagram 900 for synchronous STA transmissions on multiple links according to various exemplary embodiments. In some embodiments, when the STA 110 desires to send synchronous transmissions 906a, 906b on both links, the STA 110 may perform a PIFS CCA check 901 to determine if the medium is idle. If the medium is idle, the STA 110 may send synchronous sRTS 902a, 902b on both links to solicit the sCTS 904a, 904b on both links. As also illustrated in FIG. 9, the STA 110 may receive an acknowledgement 908a, 908b from the AP 120A on both link 1 and link 2 to acknowledge receipt of the corresponding synchronous transmissions 906a, 906b.

Figure 10:
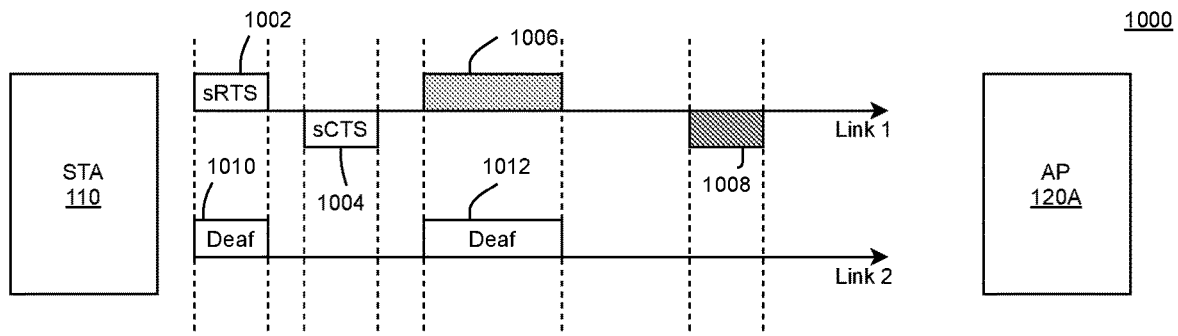
FIG. 10 shows a transmission diagram for recovery of enhanced distributed channel access (EDCA) operation according to various exemplary embodiments.

FIG. 10 shows a transmission diagram 1000 for recovery of EDCA operation according to various exemplary embodiments. As described above, in some cases, simultaneous transmission and reception on links 1 and 2 by the STA 110 may not be supported. Thus, as shown in the transmission diagram 1000, the STA 110 on link 2 may be deaf (as indicated by blocks 1010 and 1012) during the sRTS transmission 1002 and the data transmission 1006 on link 1.

To recover the EDCA operation on link 2, the STA 110 may use information including how long the medium is idle during RTS+SIFS and the current NAV at the RTS responder. This information may be provided in the sCTS 1004. For example, the sCTS 1004 may take the form of a new trigger frame or a new control frame that includes this information. As shown in the transmission diagram, the sCTS 1004 is received on link 1, but this information may be provided to the MAC/PHY of link 2 to recover the EDCA operation.

In some embodiments, the AP 120A may assist in EDCA recovery based on explicit indications in the sRTS 1002, data frames, or a report from the AP. In one exemplary embodiment, a new management frame may be defined or a new PHY header design may be used to provide this information. In another exemplary embodiment, reserved bits in a block acknowledgment (BA) 1008 or a new multilink STA BA frame extension may be used to provide this information.

The EDCA recovery using the sCTS 1004 may be useful if the CCA idle and the STA state on link 2 is not receiving during SIFS+sCTS time. For example, the NAV update may be performed as follows: if (NAV!=0), then update NAV= (NAV-SIFS-sRTS-sCTS); if (sCTS_Duration>updated NAV), then further update NAV=sCTS_Duration.

Similarly, the backoff update may be performed as follows: if (NAV==0 && CCA is Idle), then backoff counter continues counting down with additional [sCTS+ SIFS=sCTS/slot-time] slots; if (NAV!=0 && NAV<sCTS+ SIFS=sCTS && CCA is Idle), then backoff counter continues count downs with additional [sCTS+SIFS=SCTS-NAV/ slot_time].

Figure 11:
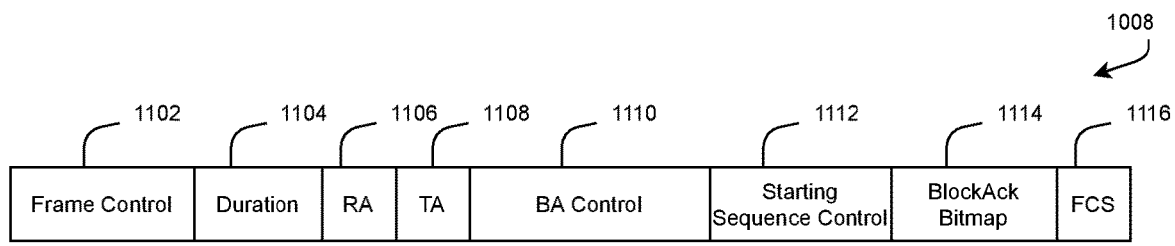
FIG. 11 shows a diagram illustrating a block acknowledgement (BA) according to various exemplary embodiments.

FIG. 11 shows a diagram illustrating a block acknowledgement (BA) 1008 according to various exemplary embodiments. As described above, in one exemplary embodiment, the EDCA recovery may be based on information provided in the BA 1008. As illustrated in FIG. 11, the BA 1008 includes a Frame Control field 1102, a Duration field 1104, a random access (RA) field 1106, a timing advance (TA) field 1108, a BA Control field 1110, a Starting Sequence Control field 1112, a BlockAck Bitmap field 1114, and a frame check sequence (FCS) field 1116. There are currently 7 bits reserved in the BA control field on a first link (e.g., link 1) that may be used to indicate the status of another link (e.g., link 2). In some embodiments, a 2-bit Link ID or a 1 or 2-bit medium status indication may be used for EDCA recovery on link 2. For example, 00 may indicate "clear medium, cancel NAV and start backoff right away," 01 may indicate "clear medium, probe the medium to update NAV, do not start backoff count down," 10 may indicate "busy medium, probe the medium," and 11 may be reserved.

Figure 12A:
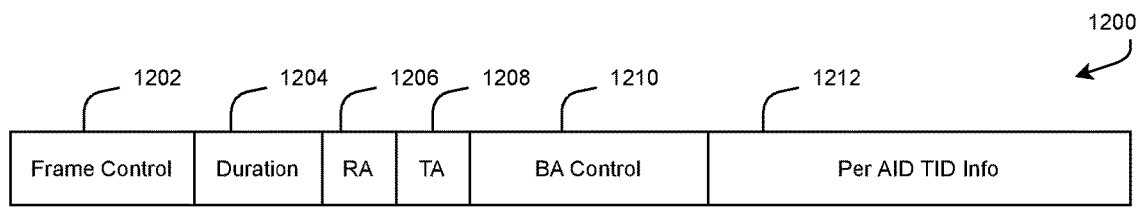
FIG. 12A shows a diagram illustrating a Multi-STA BA according to various exemplary embodiments.

FIG. 12A shows a diagram illustrating a Multi-STA BA 1200 according to various exemplary embodiments. As described above, in some embodiments, the EDCA recovery may be based on information provided in the Multi-STA BA 1200. As illustrated in FIG. 12, the Multi-STA BA 1200 includes a Frame Control field 1202, a Duration field 1204, an RA field 1206, a TA field 1208, a BA Control field 1210, and a Per association identifier (AID) traffic identifier (TID) Info field 1212 that is proposed to be expanded to a Per AID TID Link Medium Info field.

Figure 12B:
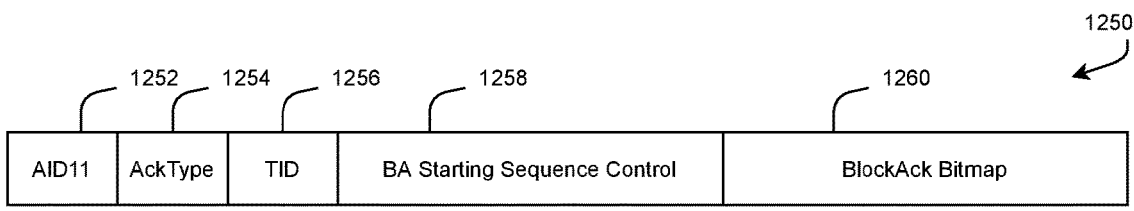
FIG. 12B shows a diagram illustrating a Per association identifier (AID) traffic identifier (TID) Link Medium Info field 1250 according to various exemplary embodiments.

FIG. 12B shows a diagram illustrating a Per AID TID Link Medium Info field 1250 according to various exemplary embodiments. As illustrated in FIG. 12B, this expanded field may include an AID11 field 1252, an Ack-Type field 1254, a TID field 1256, a BA Starting Sequence Control Field 1258, and a Block Ack Bitmap field 1260. In some embodiments, the AID 11 field 1252 may have a value greater than 2007 to indicate the AckType field 1254 and the TID field 1256 are the Link ID (e.g., the Link ID for link 2 for which the information may be used for EDCA recovery). The BA Starting Sequence Control field 1258 and the BlockAck Bitmap field 1260 may be redefined to provide the medium idle time during (T_DATA=SIFS) and the NAV update during (T_DATA+SIFS). Thus, another manner of providing the EDCA recovery information to the STA for recovery of link 2 is provided. The design of Multi-STA BA 1200 may also be extended to other use cases.

Figure 13:
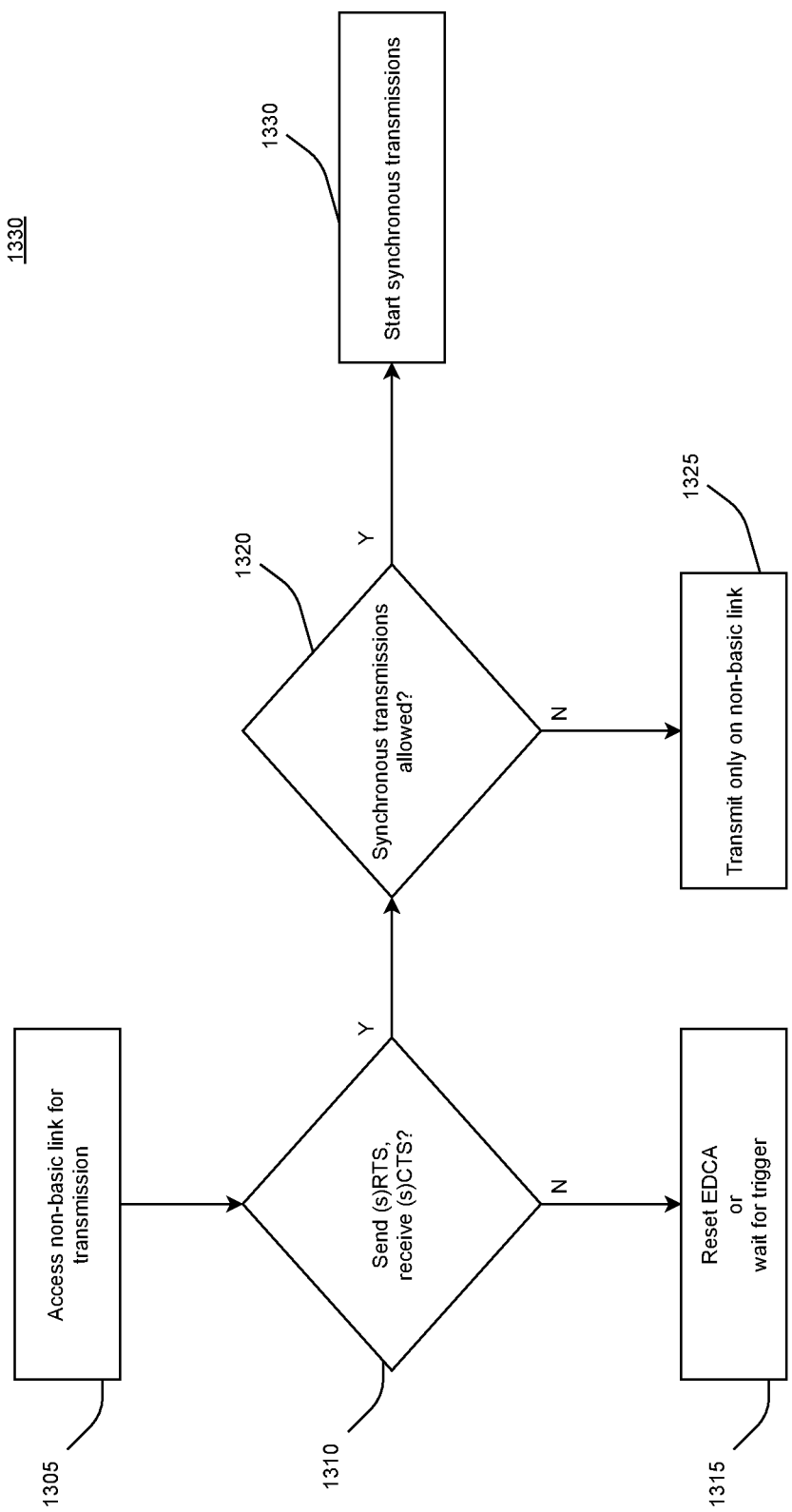
FIG. 13 shows a method for synchronous transmissions on multiple links according to various exemplary embodiments.

FIG. 13 shows a method 1300 for synchronous transmissions on multiple links according to various exemplary embodiments. As mentioned above, when a multilink STA cannot support simultaneous TX and RX and is operating on both a basic link and a non-basic link from a constrained multilink AP and the AP has STAs operating on adjacent links, an EHT STA on the non-basic link may interfere with the other STAs operation on the basic link. In some embodiments, the EHT STA uses the RTS/CTS (or sRTS/sCTS), otherwise only a trigger based access is allowed on the non-basic links.

At 1305, the STA (e.g., STA 110) accesses a non-basic link for transmission. At 1310, it is determined whether or not the STA sends/receives an RTS/CTS (or sRTS/sCTS). If the STA does not send/receive the RTS/CTS (or sRTS/ sCTS), then, at 1315, the EDCA is reset or the STA may only use trigger-based access operated on the non-basic link. If, however, the STA does send/receive the RTS/CTS (or sRTS/ sCTS), then, at 1320, the STA determines if synchronous transmissions are allowed. Exemplary manners of determining synchronous transmissions were described in detail above. If synchronous transmissions are not allowed, then, at 1325, the STA transmits on the non-basic link only. If, however, synchronous transmissions are allowed, then, at 1330, the STA will start synchronous transmissions.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a multilink station configured to perform operations comprising:
   accessing a first communication link to send a first transmission to a multilink access point;
   requesting, from the multilink access point, approval to transmit a second transmission on a second communication link, from the station to the multilink access point, contemporaneously with the first transmission on the first communication link; and
   transmitting, responsive to approval from the multilink access point, the second transmission on the second communication link such that it at least partially overlaps in time with the first transmission on the first communication link, wherein the first transmission and the second transmission end at substantially a same time based on at least a Medium Access Control (MAC) layer of the first communication link communicating a transmission time of a physical layer convergence protocol (PLCP) protocol data unit (PPDU) of the first transmission on the first link to a MAC layer of the second communication link.

2. The processor of claim 1, wherein an offset between an end time of the first transmission and an end time of the second transmission does not exceed a short interframe space (SIFS) time.

3. The processor of claim 1, wherein the operations further comprise:
   transmitting a synchronous request to send (sRTS) transmission to the multilink access point over the first communication link to indicate that the station intends to send the first transmission over the first communication link and the second transmission over the second communication link,
   wherein the indication from the multilink access point comprises a synchronous clear to send (sCTS) transmission.

4. The processor of claim 3, wherein the sRTS is also transmitted over the second link to the multilink access point.

5. The processor of claim 3, wherein the station is in a backoff state on the second link.

6. The processor of claim 5, wherein, when the sCTS is received on the first link and the second link, the operations further comprise:
   determining whether the second link can complete the backoff during the sRTS and sCTS transmissions.

7. The processor of claim 6, wherein, when the second link can complete the backoff during the sRTS and sCTS transmissions, the operations further comprise: contemporaneously transmitting the first transmission on the first communication link and the second transmission on the second communication link.

8. The processor of claim 6, wherein, when the sCTS is received on the first link, the operations further comprise:
   transmitting the first transmission on the first link.

9. The processor of claim 5, the operations further comprise:
   determining whether the sCTS is received on the first link.

10. The processor of claim 1, wherein the MAC layer of the second communication link aligns a PPDU of the second transmission in time with the PPDU of the first transmission.

11. The processor of claim 1, wherein the first transmission and the second transmission each comprise a plurality of transmissions, wherein each one of corresponding first transmissions and second transmissions end at substantially a same time.

12. A method performed by a multilink station, comprising:
    accessing a first communication link to send a first transmission to a multilink access point;
    requesting, from the multilink access point, approval to transmit a second transmission on a second communication link, from the station to the multilink access point, contemporaneously with the first transmission on the first communication link; and
    transmitting, responsive to approval from the multilink access point, the second transmission on the second communication link such that it at least partially overlaps in time with the first transmission on the first communication link, wherein the first transmission and the second transmission end at substantially a same time based on at least a Physical (PHY) layer of the first communication link communicating a transmission time of a physical layer convergence protocol (PLCP) protocol data unit (PPDU) of the first transmission on the first link to a PHY layer of the second communication link.

13. The method of claim 12, wherein substantially the same time comprises an offset between an end time of the first transmission and an end time of the second transmission does not exceed a short interframe space (SIFS) time.

14. The method of claim 12, wherein the PHY layer of the second communication link aligns a PPDU of the second transmission in time with the PPDU of the first transmission.

* * * * *